US006490653B1

(12) United States Patent
Cargnoni et al.

(10) Patent No.: US 6,490,653 B1
(45) Date of Patent: Dec. 3, 2002

(54) METHOD AND SYSTEM FOR OPTIMALLY ISSUING DEPENDENT INSTRUCTIONS BASED ON SPECULATIVE L2 CACHE HIT IN A DATA PROCESSING SYSTEM

(75) Inventors: Robert Alan Cargnoni, Austin, TX (US); Bruce Joseph Ronchetti, Austin, TX (US); David James Shippy, Austin, TX (US); Larry Edward Thatcher, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/325,397

(22) Filed: Jun. 3, 1999

(51) Int. Cl.$^7$ ................................................ G06F 12/08
(52) U.S. Cl. ........................ 711/125; 711/122; 711/137
(58) Field of Search ................................. 711/117, 122, 711/123, 124, 125, 137, 146

(56) References Cited

U.S. PATENT DOCUMENTS

| | | | | |
|---|---|---|---|---|
| 5,471,598 A | * | 11/1995 | Quattromani et al. | ........ 711/122 |
| 5,584,009 A | * | 12/1996 | Garibay, Jr. et al. | ........ 711/117 |
| 5,596,731 A | * | 1/1997 | Martinez, Jr. et al. | ...... 710/129 |
| 5,737,590 A | * | 4/1998 | Hara | ........................ 712/238 |

* cited by examiner

*Primary Examiner*—Matthew Kim
*Assistant Examiner*—Matthew D. Anderson
(74) *Attorney, Agent, or Firm*—Sawyer Law Group LLP; Casimer K. Salys

(57) ABSTRACT

A method for optimally issuing instructions that are related to a first instruction in a data processing system is disclosed. The processing system includes a primary and secondary cache. The method and system comprises speculatively indicating a hit of the first instruction in a secondary cache and releasing the dependent instructions. The method and system includes determining if the first instruction is within the secondary cache. The method and system further includes providing data related to the first instruction from the secondary cache to the primary cache when the instruction is within the secondary cache. A method and system in accordance with the present invention causes instructions that create dependencies (such as a load instruction) to signal an issue queue (which is responsible for issuing instructions with resolved conflicts) in advance, that the instruction will complete in a predetermined number of cycles. In an embodiment, a core interface unit (CIU) will signal an execution unit such as the Load Store Unit (LSU) that it is assumed that the instruction will hit in the L2 cache. An issue queue uses the signal to issue dependent instructions at an optimal time. If the instruction misses in the L2 cache, the cache hierarchy causes the instructions to be abandoned and re-executed when the data is available.

15 Claims, 4 Drawing Sheets

METHOD AND SYSTEM FOR OPTIMALLY ISSUING DEPENDENT INSTRUCTIONS BASED ON SPECULATIVE L2 CACHE HIT IN A DATA PROCESSING SYSTEM

CROSS-REFERENCE TO RELATED APPLICATIONS

The present application is related to applications Ser. No. 09/263,663, entitled "A Method and System for Optimizing the Fetching of Dispatch Groups in a Superscalar Processor", filed Mar. 5, 1999; Ser. No. 09/263,667, entitled "Instruction Buffer Arrangement for a Superscalar Processor", filed Mar. 5, 1999; Ser. No. 09/263,669, entitled "A Simplified Method to Generate BTAGs in a Decode Unit of a Processing System", filed Mar. 5, 1999; Ser. No. 09/263,664, entitled "Decode Scheme for the Optimization of Accessing Constrained or Volatile Storage", filed Mar. 5, 1999; Ser. No. 09/263,666, entitled "Destructive Operation Optimization for Operations Which Modify Partial Datums", filed Mar. 5, 1999; Ser. No. 09/263,670, entitled "Fast Microcode/Branch Selector Scheme", filed Mar. 5, 1999; and Ser. No. 09/263,668, entitled "A System and Method for Utilizing a Conditional Split for Aligning Internal Operations (IOPs) for Dispatch", filed Mar. 5, 1999.

FIELD OF THE INVENTION

The present invention relates generally to a superscalar processor and more particularly to optimally issuing dependent instructions in such a system.

BACKGROUND OF THE INVENTION

Superscalar processors employ aggressive techniques to exploit instruction-level parallelism. Wide dispatch and issue paths place an upper bound on peak instruction throughput. Large issue buffers are used to maintain a window of instructions necessary for detecting parallelism, and a large pool of physical registers provides destinations for all of the in-flight instructions issued from the window beyond the dispatch boundary. To enable concurrent execution of instructions, the execution engine is composed of many parallel functional units. The fetch engine speculates past multiple branches in order to supply a continuous instruction stream to the decode, dispatch and execution pipelines in order to maintain a large window of potentially executable instructions.

The trend in superscalar design is to scale these techniques: wider dispatch/issue, larger windows, more physical registers, more functional units, and deeper speculation. To maintain this trend, it is important to balance all parts of the processor—any bottlenecks which diminish the benefit of aggressive techniques.

Instruction fetch performance depends on a number of factors. Instruction cache hit rate and branch prediction accuracy has been long recognized as important problems in fetch performance and is well-researched areas.

Modern microprocessors routinely use a plurality of mechanisms to improve their ability to efficiently fetch past branch instructions. These prediction mechanisms allow a processor to fetch beyond a branch instruction before the outcome of the branch is known. For example, some mechanisms allow a processor to speculatively fetch beyond a branch before the branch's target address has been computed. These techniques use run-time history to speculatively predict which instructions should be fetched and eliminate "dead" cycles that might normally be wasted waiting for the actual determination of the next instruction address. Even with these techniques, current microprocessors are limited in fetching instructions during a clock cycle. As superscalar processors become more aggressive and attempt to execute many more instructions per cycle, they must also be able to fetch many more instructions per cycle.

High performance superscalar processor organizations divide naturally into an instruction fetch mechanism and an instruction execution mechanism. The fetch and execution mechanisms are separated by instruction issue buffer(s), for example, queues, reservation stations, etc. Conceptually, the instruction fetch mechanism acts as a "producer" which fetches, decodes, and places instructions into a reorder buffer. The instruction execution engine "prepares" instructions for completions. The completion engine is the "consumer" which removes instructions from the buffer and executes them, subject to data dependence and resource constraints. Control dependencies (branches and jumps) provide a feedback mechanism between the producer and consumer.

Dispatching and completion of instructions are typically in program order. However, issuance and execution are not necessarily in program order. An instruction is dispatched to an issue queue for a particular execution unit, or at least a particular type of execution unit (aka functional unit). A load/store unit is a type of functional unit for executing memory accesses. An issue queue issues an instruction to its functional unit responsive to the instruction's operands being available for execution, i.e., when results are available from any earlier dispatched instructions upon which the instruction is dependent.

SUMMARY OF THE INVENTION

In a high-speed highly speculative processor, groups of instructions are issued based on interdependencies. Some operations such as Load instructions can have variable and unpredictable latency which makes interdependency analysis difficult. A solution is needed that improves the performance of instruction groups dependent on Load operands. More particularly, what is needed is a system and method for efficiently issuing dependent instructions in such a processor. The present invention addresses such a need.

A method for optimally issuing instructions that are related to a first instruction in a data processing system is disclosed. The processing system includes a primary and secondary cache. The method and system comprises speculatively indicating a hit of the first instruction in a secondary cache and releasing the dependent instructions. The method and system includes determining if the first instruction is within the secondary cache. The method and system further includes providing data related to the first instruction from the secondary cache to the primary cache when the instruction is within the secondary cache.

A method and system in accordance with the present invention causes instructions that create dependencies (such as a load instruction) to signal an issue queue (which is responsible for issuing instructions with resolved conflicts) in advance, that the instruction will complete in a predetermined number of cycles. In an embodiment, a core interface unit (CIU) will signal an execution unit such as the Load Store Unit (LSU) that it is assumed that the instruction will hit in the L2 cache. An issue queue uses the signal to issue dependent instructions at an optimal time. If the instruction misses in the L2 cache, the cache hierarchy causes the instructions to be abandoned and re-executed when the data is available.

DESCRIPTION OF THE INVENTION

The present invention relates generally to a superscalar processor and more particularly to a system and method for improving the overall throughput in such a processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
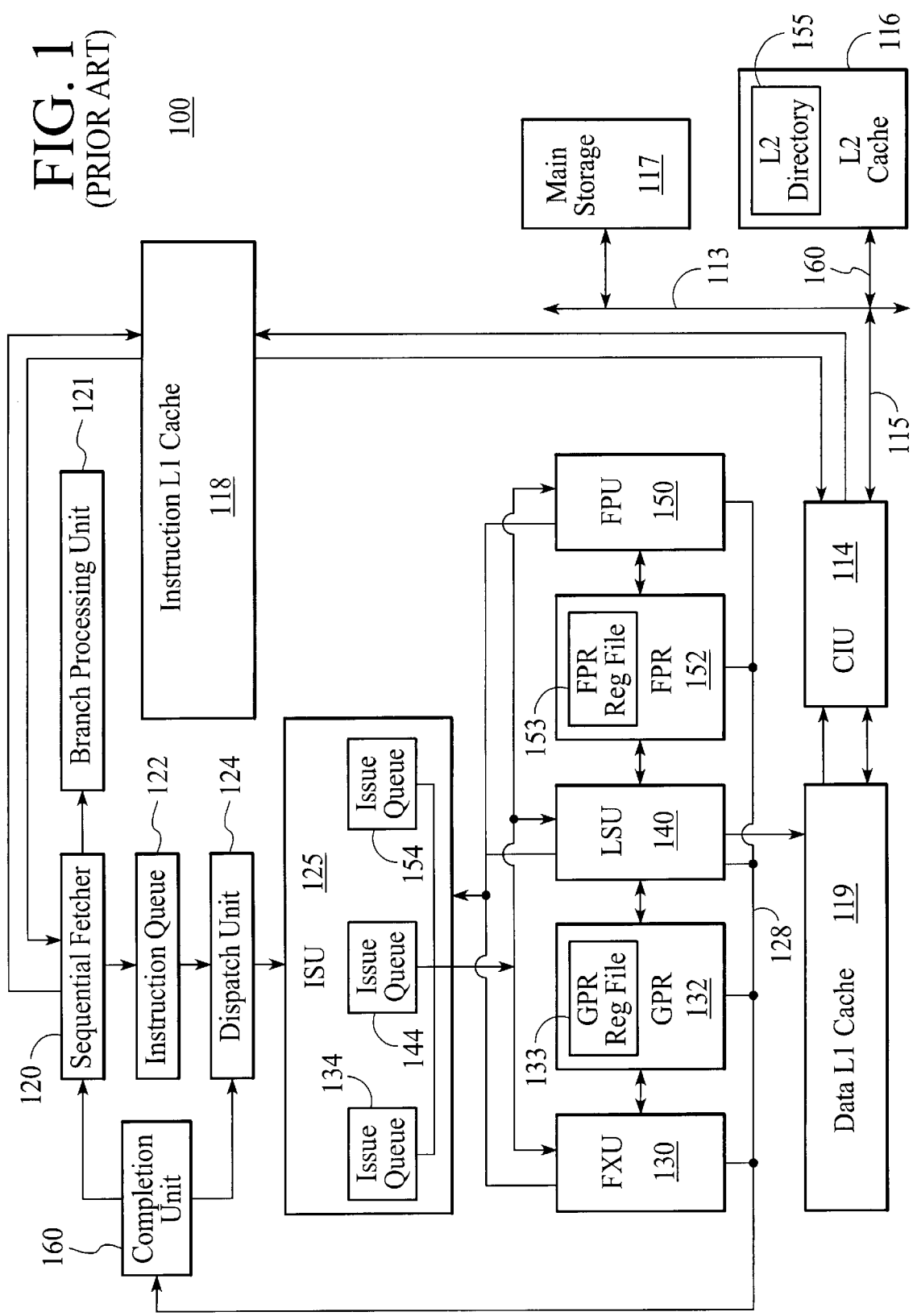
FIG. 1 is a block diagram of a conventional processor.

FIG. 1 illustrates a processor 100. Processor 100 includes issue unit (ISU) 125 which will be described in detail below with reference to FIG. 2. ISU 125 gives execution units 130, 140, and 150 the ability to reject instructions. Rejected instructions remain in ISU 125 to be reissued at a later time.

In the illustrative embodiment shown in FIG. 1, processor 100 comprises a single integrated circuit superscalar microprocessor. Accordingly, processor 100 includes various execution units, registers, buffers, memory devices, and other functional units, which are all formed by integrated circuitry. Of course, although the invention is described herein as applied to a microprocessor, the present instruction-handling scheme is not limited to microprocessors and may be implemented in other types of processors.

As illustrated in FIG. 1, processor 100 is coupled to system bus 113 via a core interface unit (CIU) 114 and processor bus 115. Both system bus 113 and processor bus 115 include address, data, and control buses which are not shown separately. CIU 114 participates in bus arbitration to control the transfer of information between processor 100 and other devices coupled to system bus 113, such as L2 cache 116 and main storage 117. The data processing system illustrated in FIG. 1 preferably includes other devices coupled to system bus 113; however, these other devices are not necessary for an understanding of the invention and are accordingly omitted from the drawings so as not to obscure the invention in unnecessary detail.

CIU 114 is connected to instruction cache 118 and data L1 cache 119. High-speed caches, such as those within instruction L1 cache 118 and data L1 cache 119, enable processor 100 to achieve relatively fast access times to a subset of data or instructions previously transferred from main memory 117 to the L2 cache 116 and then to the respective L1 cache 118 or 119, thus improving the overall processing speed. Data and instructions stored within the data cache 119 and instruction cache 118, respectively, are each identified and accessed by an effective address, which is related to the real address of the respective data or instructions in main memory 117.

Instruction L1 cache 118 is further coupled to sequential fetcher 120, which fetches instructions for execution from instruction L1 cache 118 during each processor cycle. Sequential fetcher 120 transmits branch instructions fetched from instruction L1 cache 118 to branch processing unit (BPU) 121 for execution, and temporarily stores sequential instructions within instruction queue 122 for eventual transfer to dispatch unit 124 for decoding and dispatch to the instruction issue unit (ISU) 125.

In the depicted illustrative embodiment, in addition to BPU 121, the execution circuitry of processor 100 comprises multiple execution units for executing sequential instructions, including fixed-point unit (FXU) 130, load-store unit (LSU) 140, and floating-point unit (FPU) 150. Each execution unit 130, 140, and 150 typically executes one or more instructions of a particular type during each processor cycle.

FXU 130 performs fixed-point mathematical and logical operations such as addition, subtraction, ANDing, Oring, and XORing, utilizing source operands received from specified general-purpose registers (GPRs) 132. Following the execution of a fixed-point instruction, FXU 130 outputs the data results of the instruction on result bus 128 to a GPR register file 133 associated with GPRs 132.

FPU 150 typically performs single and double-precision floating-point mathematical and logical operations, such as floating-point multiplication and division, on source operands received from floating-point registers (FPRs) 152. FPU 150 outputs data resulting from the execution of floating-point instructions on result bus 128 to a FPR register file 153, which temporarily stores the result data.

LSU 140 typically executes floating-point and fixed-point instructions which either load data from memory or which store data to memory. For example, an LSU instruction may load data from either the data L1 cache 119 or an L2 cache 116 into selected GPRs 132 and FPRs 152. Other LSU instructions may store data from a selected GPR 132 or FPR 152 to the data L1 cache 119 and then to the L2 cache 116. The L2 cache includes an L2 cache directory 155 which holds the tags for the data which is within the L2 cache.

Processor 100 employs both pipeline and out-of-order execution of instructions to further improve the performance of its superscalar architecture. Instructions can be executed by FXU 130, LSU 140, and FPU 150 in any order as long as data dependencies are observed. Within individual execution units, 130, 140, and 150, instructions are also processed in a sequence of pipeline stages unique to the particular execution unit.

During the fetch stage, sequential fetcher 120 retrieves one or more instructions associated with one or more memory addresses from instruction L1 cache 118. Sequential fetcher 120 stores sequential instructions fetched from instruction L1 cache 118 within instruction queue 122. Branch instructions are removed or folded out by sequential fetcher 120 to BPU 121 for execution. BPU 121 includes a branch prediction mechanism (not shown separately) which, in one embodiment, comprises a dynamic prediction mechanism such as a branch history table. This branch history table enables BPU 121 to speculatively execute unresolved conditional branch instructions by predicting whether or not the branch will be taken.

During the decode/dispatch stage, dispatch unit 124 decodes and dispatches one or more instructions from instruction queue 122 to ISU 125. ISU 125 includes a plurality of issue queues 134, 144, and 154, one issue queue for each execution unit 130, 140, and 150. ISU 125 also includes circuitry for receiving information from each execution unit 130, 140, and 150 and for controlling the issue queues 134, 144, and 154. According to the invention, instructions for each respective execution unit 130, 140, and 150 are stored in the respective issue queue 134, 144, and 154, and then issued to the respective execution unit to be processed. However, instructions are dropped or removed from the issue queues 134, 144, or 154 only after the issued instruction is fully executed by the respective execution unit 130, 140, or 150.

During the execution stage, execution units 130, 140, and 150 execute instructions issued from their respective issue queues 134, 144, and 154. As will be described below, each execution unit according to the invention may reject any issued instruction without fully executing the instruction. However, once the issued instructions are executed and that execution has terminated, execution units 130, 140, and 150 store the results, if any, within either GPRs 132 or FPRs 152, depending upon the instruction type. Execution units 130, 140, and 150 also notify completion unit 160 that the instructions have finished execution. Finally, instructions are completed in program order out of a completion buffer (not shown separately) associated with the completion unit 160. Instructions executed by FXU 130 are completed by releasing the old physical register associated with the destination GPR of the completed instructions in a GPR rename table (not shown). Instructions executed by FPU 150 are completed by releasing the old physical register associated with the destination FPR of the completed instructions in a FPR rename table (not shown). Load instructions executed by LSU 140 are completed by releasing the old physical register associated with the destination GPR or FPR of the completed instructions in the GPR or FPR rename table (not shown). Store instructions executed by LSU 140 are completed by marking the finished store instructions as completed in a store queue (not shown). Completed store instructions in the store queue will eventually be written to memory.

The present invention will be described below with reference specifically to one execution unit, LSU 140, along with ISU 125 and issue queue 144. The present invention is not limited to the particular LSU operation described below. Other LSU pipeline stages as well as the pipeline stages performed by other execution units are to be considered equivalents to the illustrated examples.

Figure 2:
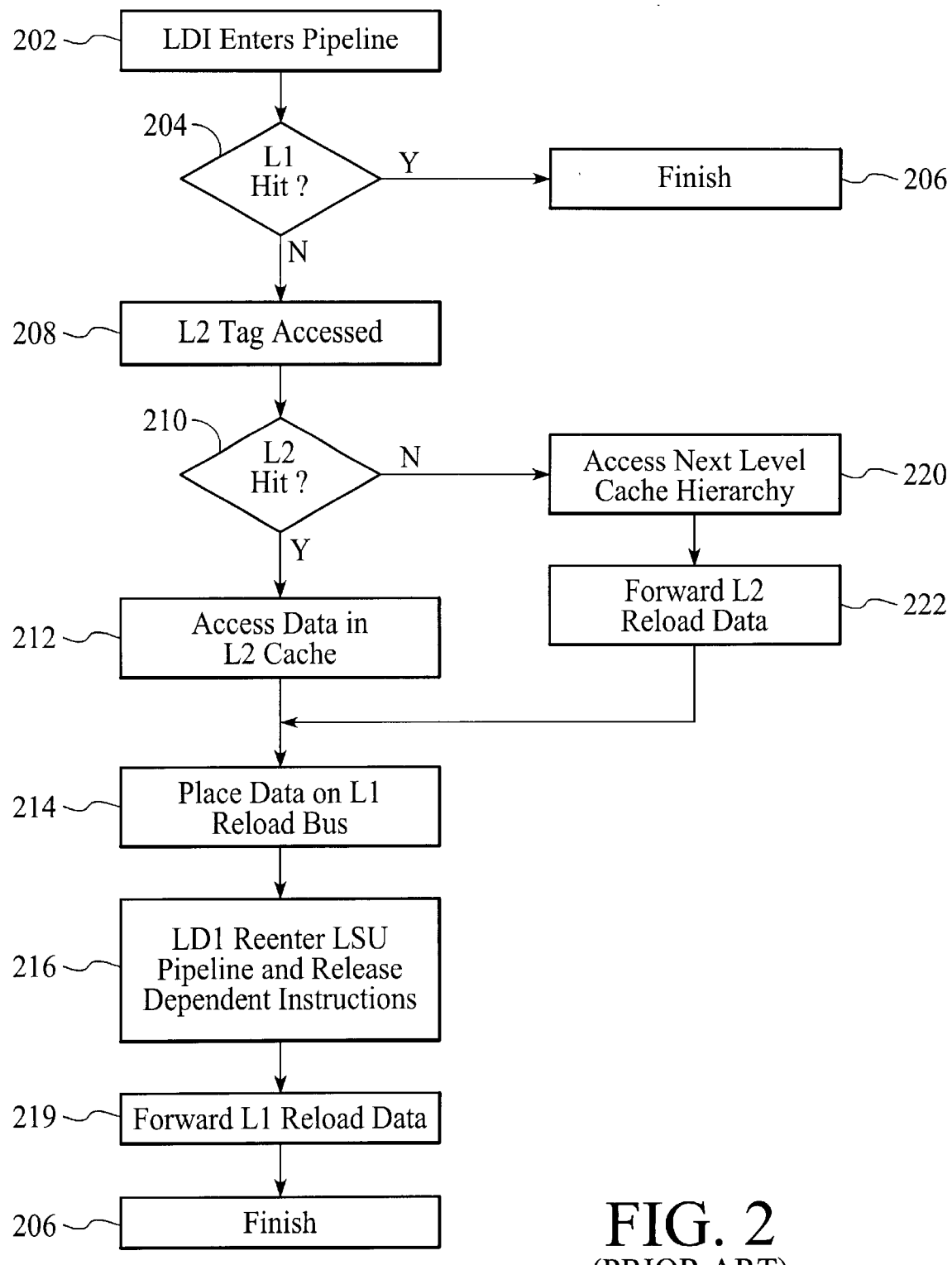
FIG. 2 is a flow chart illustrating a conventional method for issuing dependent instructions in the processor of FIG. 1.

The following illustrates the cycles of a typical LSU 140 pipeline:

Stage 0: RFL RegisterFile access cycle-read out GPR values for Load Instruction operands or receive bypass data from L1 cache for operand Stage 1: AGN Address Generation cycle—add operands together to create Load data address Stage 2: ACC Access cycle—L1 cache is addressed Stage 3: RES Results cycle—L1 cache data is available Stage 4: FIN Finish Cycle—LSU Load Completion Signaled FIG. 2 illustrates a conventional method for issuing dependent instructions in a data processing system for such a pipeline. Referring now to FIGS. 1 and 2 together, first an instruction such as a load instruction enters the LSU pipeline, via step 202. Next, it is determined whether the instruction is a hit in the data L1 cache 119, via step 204. If the instruction is a hit then it is finished, via step 206. However, if the instruction is not in the data L1 cache, then the L2 tag is accessed in the L2 cache directory 155 of L2 cache 116, via step 208. Next, it is determined if there is a hit in the L2 cache 116, via step 210. If there is a hit in the L2 cache, then the data is accessed in the L2 cache, via step 212. The data is then placed in the L1 reload bus 115 via the L2 reload bus 160 from the L2 cache 116, via step 214. Thereafter, the LSU pipeline is reentered and the dependent instructions are released by the LSU 140, via step 216. Thereafter, the L1 reload data is forwarded to the LSU 140, via step 219. Finally, the instructions are finished, via step 206. Typically these instructions are finished on a cache line basis. If there is not a hit in the L2 cache, then the next higher level of the cache hierarchy is accessed via step 220 and the L2 reload data is forwarded, via step 222. Then steps 212–218 are enabled.

The problem with the above-identified conventional system is that by waiting to determine if the data is in the L2 cache the release of dependent instructions impacts the overall performance of the processor. It has been determined that additional cycles are required when waiting for the determination of the L2 cache.

A method and system in accordance with the present invention causes instructions that create dependencies (such as a load instruction) to signal an issue queue (which is responsible for issuing instructions with resolved conflicts) in advance, that the instruction will complete in a predetermined number of cycles. In a preferred embodiment, referring to FIG. 3, the CIU 114 will signal the LSU 140 via signal 161 that it is assumed that the instruction will hit in the L2 cache 116. The issue queue 144 of the ISU 125 uses the signal to issue dependent instructions at an optimal time. If the instruction misses in the L2 cache 116, the cache hierarchy causes the instructions to be abandoned and re-executed when the data is available.

Figure 3:
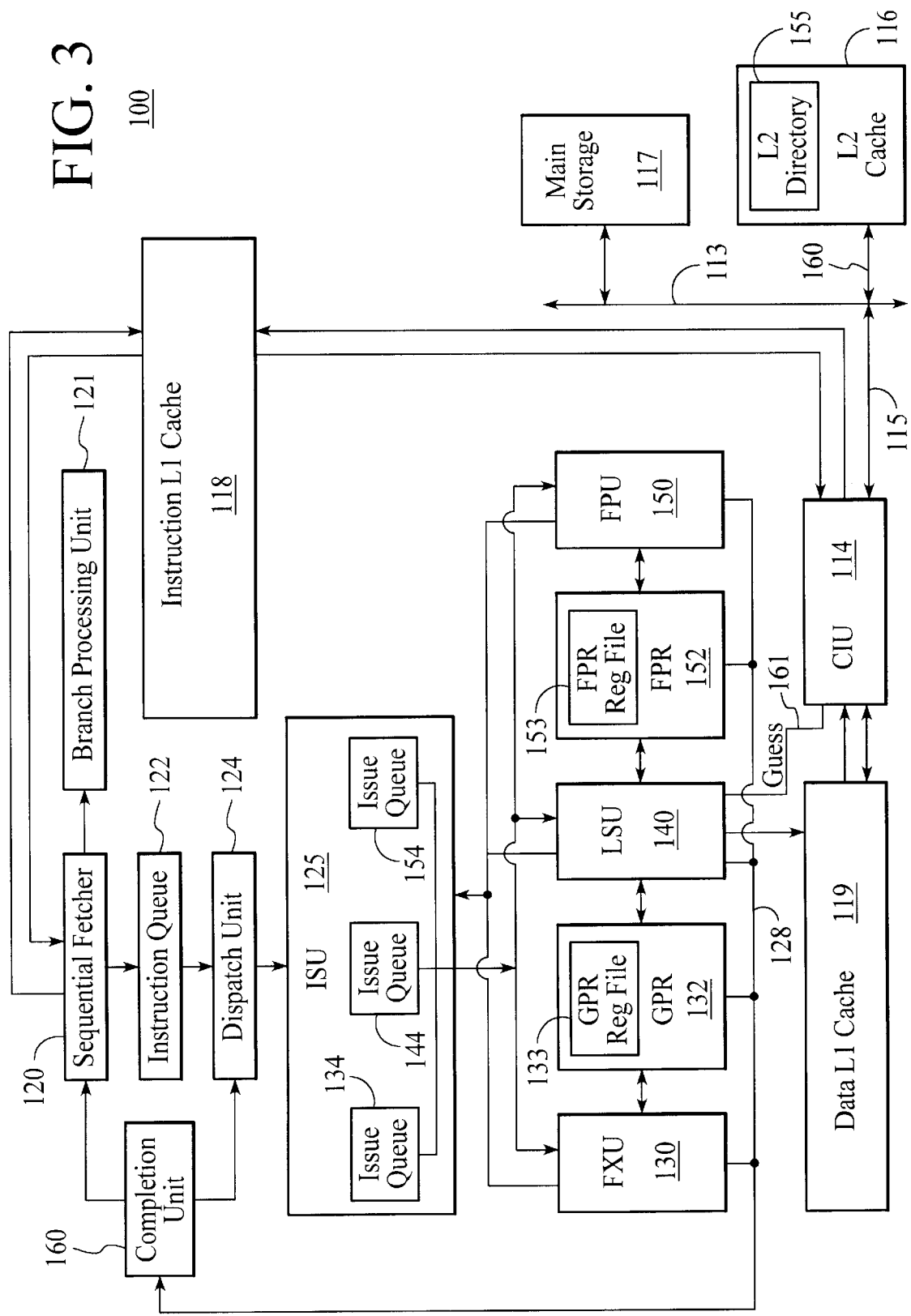
FIG. 3 is a block diagram of a processor in accordance with the present invention.
Figure 4:
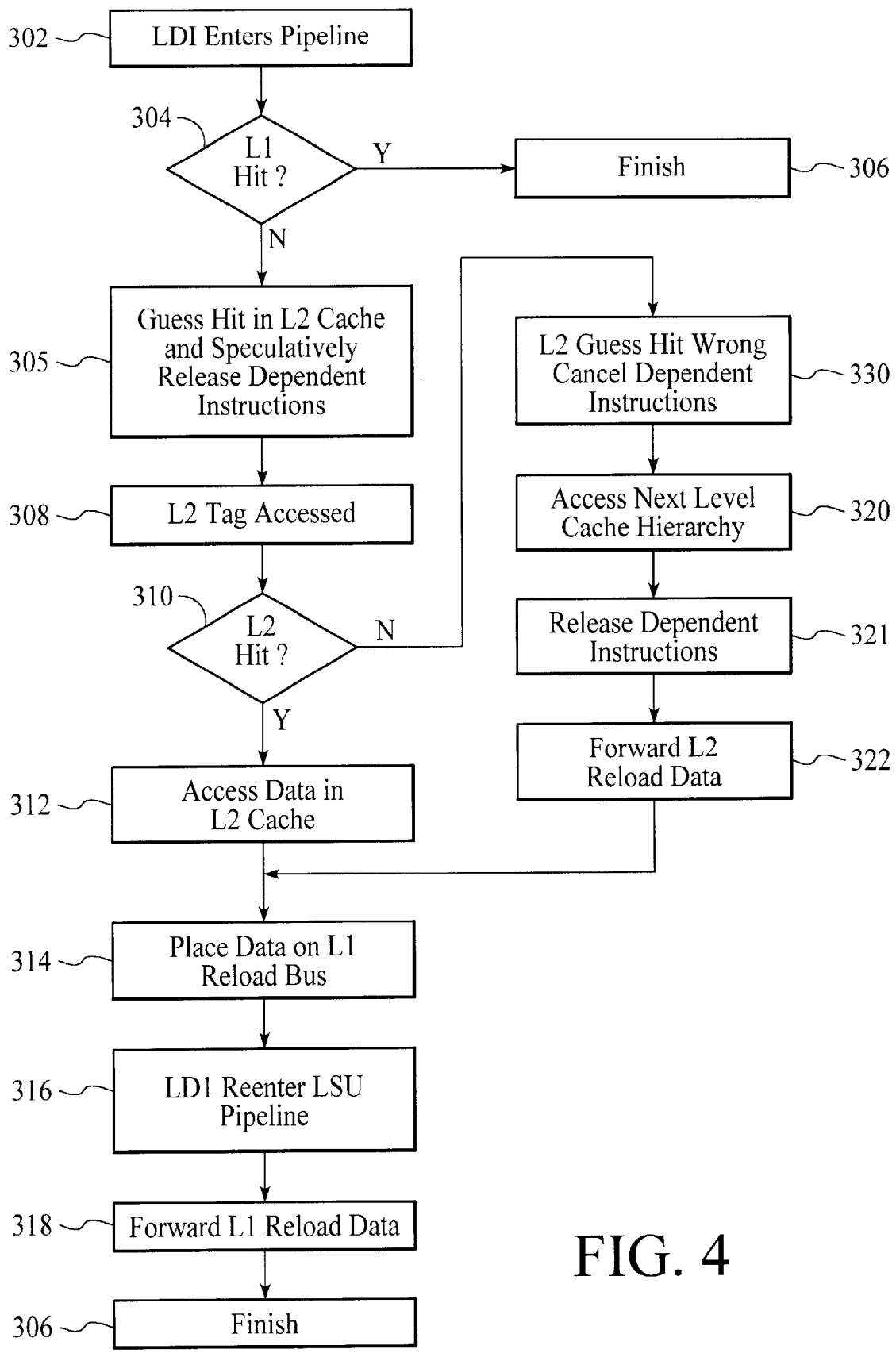
FIG. 4 is a flow chart illustrating a method for issuing dependent instructions in a data processing system in accordance with the present invention.

To describe the operation of the present invention in more the detail, refer now to the following discussion in conjunction with the accompanying figures. FIG. 3 is a block diagram of a processor in accordance with the present invention. FIG. 3 is similar to FIG. 1 except for a signal 161 from the CIU 114 which at the appropriate time causes the LSU 140 to release instructions dependent upon the load instruction. Accordingly, as is seen elements in FIG. 3 which are similar to the elements in FIG. 1 have the same reference numbers. FIG. 4 is a flow chart illustrating a method for issuing dependent instructions in a data processing system in accordance with the present invention.

Referring now to FIGS. 3 and 4 together, first the instruction enters the pipeline, via step 302. Next it is determined whether the instruction is a hit in the data cache, via step 304. If the instruction is a hit then it is finished, via step 306. However, if the instruction is not in the L1 cache, a guess signal 161 from the CIU 114 will be provided to the LSU which releases the dependent instructions from the LSU 140, via step 307. This guess signal 161 is, in effect, speculatively guessing that the instruction is a hit in the L2 cache and therefore causes the release of its dependent instructions. Next, the L2 tag is accessed via the L2 cache directory 155, via step 308. Then, it is determined if there is a hit in the L2 cache, via step 310. If there is a hit in the L2 cache, then the data is accessed in the L2 cache, via step 312. The data is then placed on the L1 reload bus via step 314. Thereafter, the LSU 140 pipeline is reentered, via step 316. The L1 reload data is then forwarded to the LSU 140, via step 318. Finally, the instructions are finished, via step 306.

If the data is not in the L2 cache, then guess L2 hit is wrong, via step 330. and the dependent instructions are cancelled. Thereafter, the next level of the cache hierarchy is accessed, via step 320. The dependent instructions are then released, via step 321. Thereafter the L2 reload data is forwarded, via step 322. Then steps 314–318 are repeated.

Accordingly, by speculatively releasing the dependent instructions, via the guess signal prior to knowing if the instruction is in the L2 cache, the performance of the processor is significantly improved. A speculative guess of a hit in the L2 cache is reliable because the L2 cache is typically very large and has a high probability of hit. On an L2 miss the instruction reenters the LSU pipeline and fails to return data. The LSU then releases any held dependent instructions and they are then canceled. This uses pipeline slots but the cost is very small versus the gain accomplished when there is a hit in the L2 cache.

A method for optimally issuing instructions that are related to a first instruction in a data processing system is disclosed. The processing system includes a primary and secondary cache. The method and system comprises speculatively indicating a hit of the first instruction in a secondary cache and releasing the dependent instructions. The method and system includes determining if the first instruction is within the secondary cache. The method and system further includes providing data related to the first instruction from the secondary cache to the primary cache when the instruction is within the secondary cache. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for optimally issuing instructions that are dependent on a first instruction in a data processing system, the processing system including a primary and secondary cache, the method comprising the steps of:

(a) speculatively indicating a hit of the first instruction in a secondary cache and releasing the dependent instructions;
   (b) determining if the first instruction is within the secondary cache; and
   (c) providing data related to the first instruction and the dependent instructions from the secondary cache to the primary cache when the first instruction is within the secondary cache.

2. The method of claim 1 wherein the first instruction comprises a load instruction.

3. The method of claim 2 wherein the primary cache comprises a data L1 cache.

4. The method of claim 3 wherein the secondary cache comprises an L2 cache.

5. The method of claim 4 which includes the step of:
   (d) canceling the load instruction and its dependent instructions when the first instruction is not within the L2 cache.

6. A processor for optimally issuing instructions that are dependent on a first instruction comprising:
   an execution unit for issuing instructions;
   primary cache coupled to the execution unit;
   a secondary cache; and
   a core interface unit coupled to the primary cache, the secondary cache and the execution unit, the core interface unit for providing a signal to the execution unit when a first instruction is not a hit in the primary cache, the signal causing the execution unit to guess that a hit of the first instruction has occurred in the secondary cache and speculatively release instructions that are dependent upon the first instruction.

7. The processor of claim 6 wherein the first instruction comprises a load instruction.

8. The processor of claim 7 wherein the primary cache comprises a data L1 cache.

9. The processor of claim 8 wherein the secondary cache comprises an L2 cache.

10. The processor of claim 9 wherein the execution unit comprises a load store unit.

11. A system for optimally issuing instructions that are dependent on a first instruction in a data processing system, the processing system including a primary and secondary cache, the system comprising:
    means for speculatively indicating a hit of the first instruction in a secondary cache and releasing the dependent instructions;
    means for determining if the first instruction is within the secondary cache; and
    means for providing data related to the first instruction and the dependent instructions from the secondary cache to the primary cache when the first instruction is within the secondary cache.

12. The system of claim 11 wherein the first instruction comprises a load instruction.

13. The system of claim 12 wherein the primary cache comprises a data L1 cache.

14. The system of claim 13 wherein the secondary cache comprises an L2 cache.

15. The system of claim 14 which includes:
    means for canceling the load instruction and its dependent instructions when the first instruction is not within the L2 cache.

\* \* \* \* \*